United States Patent
Kinoshita et al.

(10) Patent No.: US 10,960,753 B2
(45) Date of Patent: Mar. 30, 2021

(54) SADDLE RIDING VEHICLE

(71) Applicant: HONDA MOTOR CO., LTD., Tokyo (JP)

(72) Inventors: Masayuki Kinoshita, Wako (JP); Koji Kiyono, Wako (JP); Kenta Shiono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 220 days.

(21) Appl. No.: 16/106,217

(22) Filed: Aug. 21, 2018

(65) Prior Publication Data
US 2019/0061511 A1 Feb. 28, 2019

(30) Foreign Application Priority Data
Aug. 30, 2017 (JP) .............................. JP2017-165540

(51) Int. Cl.
*B60K 11/04* (2006.01)
*B62J 17/00* (2020.01)
(Continued)

(52) U.S. Cl.
CPC ............... *B60K 11/04* (2013.01); *B62J 17/00* (2013.01); *B62K 11/04* (2013.01); *B62K 19/48* (2013.01);
(Continued)

(58) Field of Classification Search
CPC ......... B60K 11/04; B62K 11/00; B62K 11/04; B60H 1/00025; B60H 1/0025; F01P 5/06;
(Continued)

(56) References Cited

U.S. PATENT DOCUMENTS 4,632,206 A * 12/1986 Morinaka ................ B62J 17/02
165/41
5,577,570 A * 11/1996 Shiohara ................ B60K 13/02
180/219
(Continued)

FOREIGN PATENT DOCUMENTS

JP S59-197796 A 11/1984
JP 61-058624 4/1986
(Continued)

OTHER PUBLICATIONS

Australian Office Action dated Jan. 30, 2019, 5 pages.
(Continued)

*Primary Examiner* — Anne Marie M Boehler
(74) *Attorney, Agent, or Firm* — Rankin, Hill & Clark LLP (57) ABSTRACT

A saddle riding vehicle includes: a body frame having a head pipe and a main tube extending from the head pipe; an engine disposed below the main tube; a down frame extending downward from the body frame and disposed in front of the engine; and a radiator disposed in front of the engine and on a side of the down frame, wherein an opening which opens rearward is formed in a fan shroud which covers a rear surface of the radiator, a radiator fan is disposed in the opening, and a front surface of the radiator fan is disposed such that an axis of the radiator fan is inclined toward an outside with respect to a direction in which a surface of a core of the radiator is directed so as to increase a gap with respect to the core from an outer side toward an inner side.

5 Claims, 6 Drawing Sheets

(51) Int. Cl.
  *B62K 11/04* (2006.01)
  *F01P 11/10* (2006.01)
  *F01P 5/06* (2006.01)
  *B60H 1/00* (2006.01)
  *B62J 23/00* (2006.01)
  *B62M 7/02* (2006.01)
  *B62K 19/48* (2006.01)

(52) U.S. Cl.
  CPC ........... *B62M 7/02* (2013.01); *B60H 1/00028* (2013.01); *B60Y 2200/12* (2013.01); *B62J 23/00* (2013.01); *F01P 5/06* (2013.01); *F01P 11/10* (2013.01)

(58) Field of Classification Search
  CPC ........ F01P 11/00; F01P 2050/16; B62J 23/00; F02M 35/162; B62M 7/00; B62M 7/02
  USPC ...................... 180/219, 229, 68.1, 68.4, 68.6
  See application file for complete search history.

(56) References Cited

U.S. PATENT DOCUMENTS

| | | | |
|---|---|---|---|
| 7,556,115 B2* | 7/2009 | Iwanaga | B62J 99/00 |
| | | | 180/219 |
| 8,122,990 B2* | 2/2012 | Suzuki | B60K 11/04 |
| | | | 180/218 |
| 9,676,271 B1* | 6/2017 | Barzen | B60K 11/08 |
| 2001/0004011 A1* | 6/2001 | Hasumi | F04D 29/661 |
| | | | 165/125 |
| 2008/0236783 A1 | 10/2008 | Morita et al. | |
| 2010/0018793 A1* | 1/2010 | Arnold | B62K 19/30 |
| | | | 180/229 |
| 2013/0168039 A1* | 7/2013 | Arai | B60H 1/00021 |
| | | | 165/41 |
| 2014/0209405 A1* | 7/2014 | Nakamura | B60K 13/04 |
| | | | 180/309 |
| 2015/0068830 A1* | 3/2015 | Nakata | F28F 9/001 |
| | | | 180/229 |
| 2016/0244119 A1* | 8/2016 | Ishida | B62K 11/04 |
| 2016/0375757 A1 | 12/2016 | Danielson et al. | |
| 2017/0021719 A1* | 1/2017 | Jyouzaki | B62J 99/00 |
| 2017/0022876 A1* | 1/2017 | Hoshi | B60K 11/04 |

FOREIGN PATENT DOCUMENTS

| | | | | |
|---|---|---|---|---|
| JP | S61-287879 | | 12/1986 | |
| JP | H03-132491 | | 6/1991 | |
| JP | H06-255555 | A | 9/1994 | |
| JP | H07-10060 | A | 1/1995 | |
| JP | 2011-106462 | | 6/2011 | |
| JP | 2013-136273 | | 7/2013 | |
| JP | 2016-150640 | A | 8/2016 | |
| JP | 2016-168948 | | 9/2016 | |
| WO | WO-2013054406 A1 * | | 4/2013 | .............. F01P 11/10 |

OTHER PUBLICATIONS

Japanese Office Action dated Apr. 2, 2019, English translation included, 10 pages.
European Search Report dated Jan. 25, 2019, 9 pages.
European Office Action dated Jan. 30, 2020, 6 pages.
Japanese Office Action with English translation dated Nov. 12, 2019, 9 pages.

* cited by examiner

SADDLE RIDING VEHICLE

INCORPORATION BY REFERENCE

The present application claims priority under 35 U.S.C. § 119 to Japanese Patent Application No. 2017-165540 filed on Aug. 30, 2017. The content of the application is incorporated herein by reference in its entirety.

TECHNICAL FIELD

The present invention relates to a saddle riding vehicle.

BACKGROUND ART

Patent Literature 1 describes an air guide structure of a radiator where a shroud is disposed so as to cover an electrically operated fan of a radiator in a saddle riding vehicle thus guiding hot air downward. In this patent literature 1, with a provision of the air guide structure of the radiator, hot air from the electrically operated fan is minimally stagnated in a cowl so that a rider does not feel discomfort of hot air from the electrically operated fan.

CITATION LIST

Patent Literature

[Patent Literature 1] JP-A No. 2013-136273

SUMMARY OF INVENTION

Technical Problem

In patent literature 1, a shape of the radiator fan shroud is studied with respect to a direction of air discharged from a radiator fan. However, patent literature 1 does not disclose a structure for easily guiding cooled air which passes through the radiator to the radiator fan.

The present invention has been made in view of the above-mentioned circumstances, and it is an object of the present invention to provide a saddle riding vehicle where cooled air which passes through a radiator can be easily guided to a radiator fan.

Solution to Problem

An aspect of the present invention is directed to a saddle riding vehicle including: a body frame (F) having a head pipe (17) and a main tube (22) extending rearward from the head pipe (17); an engine (10) disposed below the main tube (22); a down tube (19) extending downward from the body frame (F) and disposed in front of the engine (10); and a radiator (41L) disposed in front of the engine (10) and on a side of the down tube (19), wherein an opening (82) which opens rearward is formed in a fan shroud (80) which covers a rear surface of the radiator (41L), a radiator fan (90) is disposed in the opening (82), and a front surface (92a) of the radiator fan (90) is disposed such that an axis (L1) of the radiator fan (90) is inclined toward an outside with respect to a direction (N1) in which a surface (113a) of a core (113) of the radiator (41L) is directed so as to increase a gap (S) with respect to the core (113) from an outer side toward an inner side.

In the above-mentioned aspect of the invention, the fan shroud (80) may include: a rear wall (81) covering the rear surface (113a) of the core (113); and a peripheral wall (84) for connecting an edge portion of the rear wall (81) to the core (113), and the rear wall (81) may be disposed in an inclined manner with respect to the core (113) such that the gap (S) with respect to the core (113) of the radiator (41L) is increased from the outside toward the inside along the front surface (92a) of the radiator fan (90).

In the above-mentioned aspect of the invention, a fuel tank (42) may be disposed above the engine (10), a radiator shroud (50L) extending from a side of the fuel tank (42) to a side of the radiator (41L) may be disposed so as to cover a side of the radiator (41L), and a cutaway portion (50a) which makes a space behind the radiator fan (90) open to an outside is formed in the radiator shroud (50L) at a same height as the radiator fan (90).

In the above-mentioned aspect of the invention, the fan shroud (80) may be disposed below the core (113), and a rear open portion (113b) having a rear surface (113a) which is not covered by the fan shroud (80) may be disposed above the core (113).

In the above-mentioned aspect of the invention, the opening (82) formed in the radiator fan (90) of the fan shroud (80) may have a grid-like guard member (83) which covers a rear side of the radiator fan (90).

Advantageous Effects of Invention

The saddle riding vehicle according to the aspect of the present invention includes: a body frame having a head pipe and a main tube extending rearward from the head pipe; an engine disposed below the main tube; a down tube extending downward from the body frame and disposed in front of the engine; and a radiator disposed in front of the engine and on a side of the down tube, wherein an opening which opens rearward is formed in a fan shroud which covers a rear surface of the radiator, a radiator fan is disposed in the opening, and a front surface of the radiator fan is disposed such that an axis of the radiator fan is inclined toward an outside with respect to a direction that a surface of a core is directed so as to increase a gap with respect to the core of the radiator from an outer side toward an inner side. With such a configuration, a volume of the space defined between the front surface of the radiator fan and the core of the radiator can be increased. Accordingly, cooled air which passes through the radiator can be easily guided to the radiator fan and hence, a large amount of cooled air can easily pass through the radiator rearward whereby cooling performance of the radiator can be enhanced.

In the above-mentioned aspect of the invention, the fan shroud may include: a rear wall covering the rear surface of the core; and a peripheral wall for connecting an edge portion of the rear wall to the core, and the rear wall may be disposed in an inclined manner with respect to the core such that the gap with respect to the core of the radiator is increased from the outside toward the inside along the front surface of the radiator fan. With such a configuration, a volume of the space defined between the front surface of the radiator fan and the core of the radiator can be increased. Accordingly, cooled air which passes through the radiator can be easily guided to the radiator fan and hence, a large amount of cooled air can easily pass through the radiator rearward whereby cooling performance of the radiator can be enhanced.

In the above-mentioned aspect of the invention, a fuel tank may be disposed above the engine, a radiator shroud extending from a side of the fuel tank to a side of the radiator may be disposed so as to cover a side of the radiator, and a cutaway portion which makes a space behind the radiator fan open to an outside may be formed in the radiator shroud at a same height as the radiator fan. With such a configuration, a travelling air and air discharged from the radiator can easily pass outward through the air guide structure of the radiator.

In the above-mentioned aspect of the invention, the fan shroud may be disposed below the core, and a rear open portion having a rear surface which is not covered by the fan shroud may be disposed above the core. With such a configuration, travelling air can easily pass through the radiator during traveling of the vehicle and hence, cooling performance can be enhanced.

Further, in the above-mentioned aspect of the invention, the opening formed in the radiator fan of the fan shroud may have a grid-like guard member which covers a rear side of the radiator fan. With such a configuration, mud and pebbles minimally hit the radiator fan.

DESCRIPTION OF EMBODIMENT

Hereinafter, an embodiment of the present invention is described with reference to drawings. In the description, directions such as front and rear, left and right, and up and down are set equal to directions of a vehicle body unless otherwise specified. Further, in the respective drawings, symbol FR indicates a frontward direction of the vehicle body, symbol UP indicates an upward direction of the vehicle body, and symbol LH indicates a leftward direction of the vehicle body.

Figure 1:
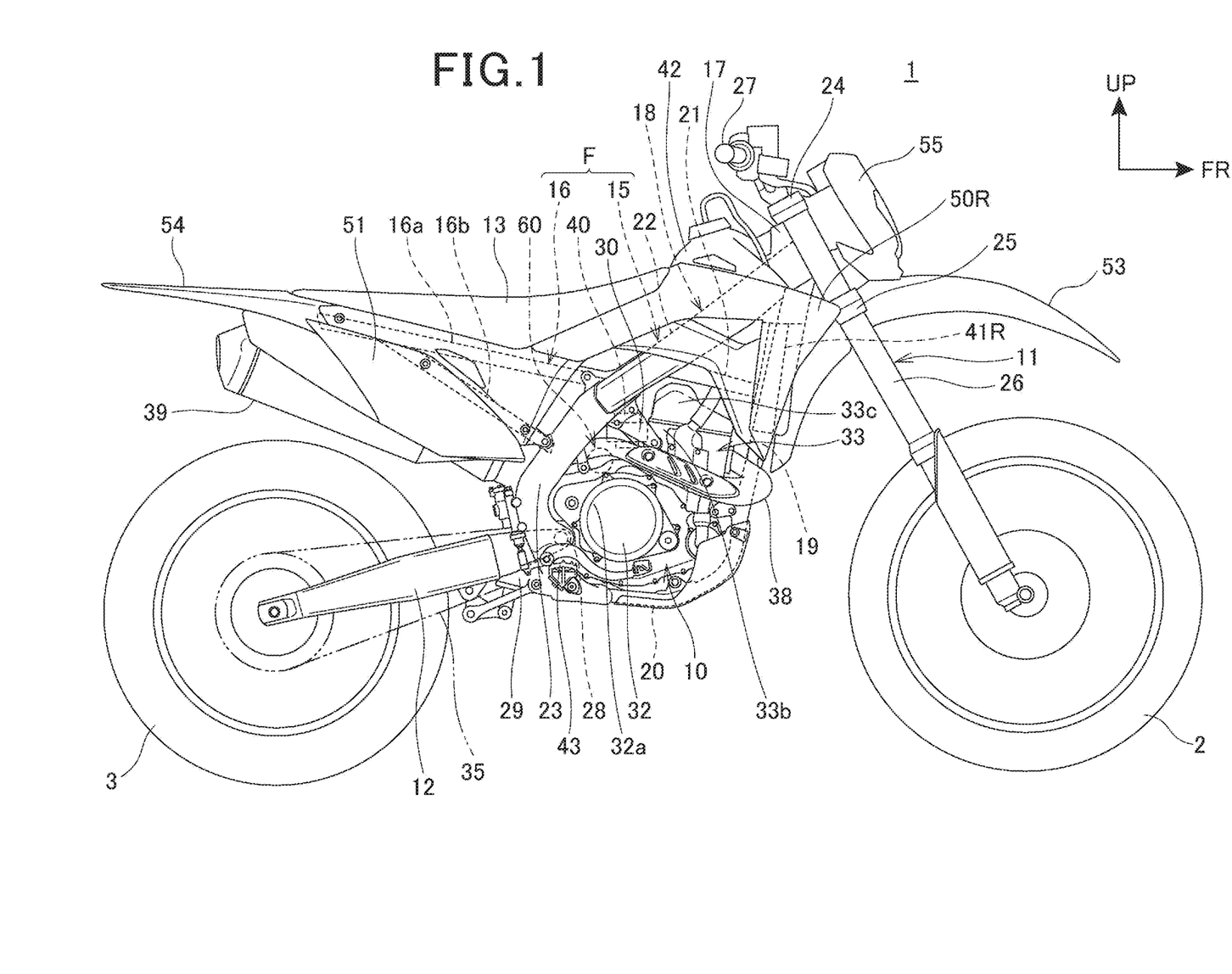
FIG. 1 is a right side view of a motorcycle according to an embodiment of the present invention.

FIG. 1 is a right side view of a motorcycle 1 according to an embodiment of the present invention. In FIG. 1, with respect to constitutional elements which are respectively provided in a left and right pair, only the constitutional elements on a right side are shown including symbols.

The motorcycle 1 is a vehicle which is configured such that an engine 10 which forms a power unit is supported by a body frame F, a front fork 11 which supports a front wheel 2 in a steerable manner is supported by a front end of the body frame F in a steerable manner, and a rear fork 12 which supports a rear wheel 3 is provided on a rear portion side of the body frame F. The motorcycle 1 is a saddle riding vehicle where a seat 13 on which a rider sits on the vehicle in a straddling manner is disposed above a rear portion of the body frame F.

The body frame F includes: a front frame 15 which supports the engine 10 which forms an internal combustion engine; and a rear frame 16 which extends rearward from the front frame 15.

The front frame 15 includes: a head pipe 17 which is provided on a front end of the front frame 15; a pair of left and right main frames 18, 18; a down frame (down tube) 19; a pair of left and right lower frames 20, 20; and a reinforcing frame 21.

To be more specific, the main frames 18, 18 include, as integral parts thereof: a pair of left and right main tubes 22, 22 which extends rearward and downward from a rear surface of the head pipe 17; and a pair of left and right pivot frames 23, 23 which extends rearward and downward from rear ends of the main tubes 22, 22 respectively. Front end portions of the main frames 18, 18 extend rearward and downward while increasing a distance therebetween in a vehicle width direction, and rear portions of the main frames 18, 18 extend rearward and downward approximately parallel to each other.

An upper end portion of the down frame 19 is connected to lower portions of the main frames 18, 18 on a rear portion of the head pipe 17 and on front end portions of the main frames 18, 18, and extends rearward and downward with an inclination steeper than the main frames 18, 18. The down frame 19 is one frame extending at the center in the vehicle width direction.

The pivot frames 23, 23 extend downward with a rearward and downward inclination steeper than the main tubes 22, 22 from rear ends of the main tubes 22, 22.

The lower frames 20, 20 respectively extend downward after being branched from a lower end portion of the down frame 19 and, subsequently, the lower frames 20, 20 are bent and extend rearward, and are connected to lower end portions of the pivot frames 23, 23.

The reinforcing frame 21 connects the down frame 19 and the main tubes 22, 22 to each other.

The rear frame 16 includes: a pair of left and right seat frames 16a, 16a which extends rearward from rear end portions of the main frames 18, 18; and a pair of left and right sub frames 16b, 16b which connects the pivot frames 23, 23 and rear portions of the seat frames 16a, 16a to each other.

The front fork 11 includes: a steering shaft (not shown in the drawing) which is pivotally supported by the head pipe 17; a top bridge 24 which is fixed to an upper end of the steering shaft; a bottom bridge 25 which is fixed to a lower end of the steering shaft; and a pair of fork tubes 26, 26 which is disposed on left and right sides of the head pipe 17 and is supported by the top bridge 24 and the bottom bridge 25 respectively.

The front wheel 2 is pivotally supported by lower end portions of fork tubes 26, 26. A handlebar 27 which a driver uses for steering the front wheel 2 is attached on the top bridge 24.

With respect to the rear fork 12 which extends rearward and is formed in an arm shape, a front end portion of the rear fork 12 is pivotally supported by a pivot shaft 28 which connects rear end portions of the left and right pivot frames 23, 23 to each other in the vehicle width direction so that the rear fork 12 is swung in a vertical direction about the pivot shaft 28. The rear wheel 3 is pivotally supported by a rear end portion of the rear fork 12.

A rear suspension 29 is extended between a front portion of the rear fork 12 and the front frame 15.

The engine 10 is disposed inside the front frame 15 which is formed in a frame shape as viewed in a side view, and is supported by the front frame 15. An engine hanger 30 extending frontward and downward is fixed to intermediate portions of the main frames 18, 18 in the vertical direction.

The engine 10 includes: a crankcase 32 which supports a crankshaft extending in the vehicle width direction; and a cylinder portion 33 which extends upward from a front portion of the crankcase 32.

The cylinder portion 33 includes: a cylinder (not shown in the drawing) which is joined to an upper portion of a front portion of the crankcase 32; a cylinder head 33b which is joined to an upper surface of the cylinder; and a cylinder head cover 33c.

A transmission (not shown in the drawing) is incorporated in a rear portion 32a of the crankcase 32. The engine 10 is of a water-cooled type.

A front end portion of the engine hanger 30 is connected to a rear portion of the cylinder head 33b.

An output of the engine 10 is transmitted to the rear wheel 3 by a chain 35 which is extended between and wound around an output shaft (not shown in the drawing) of the above-mentioned transmission of the engine 10 and the rear wheel 3.

An exhaust pipe 38 of the engine 10 is pulled out frontward from an exhaust port formed on a front surface of the cylinder head 33b and extends toward one side (right side) in the vehicle width direction and, subsequently, the exhaust pipe 38 is bent rearward, and extends rearward while passing along a right side of the cylinder portion 33. A rear end portion of the exhaust pipe 38 is connected to a muffler 39 positioned above the rear wheel 3.

An intake system (intake device) of the engine 10 includes: an air cleaner box (not shown in the drawing) which takes outside air in the engine 10; and a throttle body 40 which is connected to an intake port formed in a rear surface of the cylinder head 33b. A flow rate of air taken from the air cleaner box is regulated in the throttle body 40 and the air is supplied to the engine 10. A fuel is injected into an intake passage of the above-mentioned intake system by a fuel supply device (not shown in the drawing).

The motorcycle 1 includes a pair of left and right plate-like radiators 41L, 41R which radiates heat of cooling water for cooling the engine 10. The radiators 41L, 41R are disposed on left and right sides of the down frame 19 in a divided manner in front of the cylinder portion 33.

A fuel tank 42 is disposed between the head pipe 17 and the seat 13 and between the left and right main frames 18, 18, and is supported by the main frames 18, 18. An upper portion of the fuel tank 42 projects upward from upper surfaces of the main frames 18, 18.

The seat 13 extends rearward from a rear portion of the fuel tank 42 along upper surfaces of the seat frames 16a, 16a. The seat 13 is supported by the fuel tank 42 and the seat frames 16a, 16a from below.

A pair of steps 43, 43 on which a driver places his foot is disposed on lower end portions of the pivot frames 23, 23.

The motorcycle 1 includes: a pair of left and right radiator shrouds 50L, 50R; and a pair of left and right side covers 51, 51 as a vehicle body cover covering a vehicle body formed of the body frame F, the engine 10 and the like.

The radiator shrouds 50L, 50R are plate-like covers which cover the radiators 41L, 41R, an upper portion of the down frame 19, the main tubes 22, 22, and the fuel tank 42 from the outside. The radiator shrouds 50L, 50R are fixed to the radiators 41L, 40R, the main tubes 22, 22, and the fuel tank 42 by fixing jigs respectively.

The side covers 51, 51 cover the rear frame 16 and the muffler 39 from the outside respectively.

The motorcycle 1 includes: a front fender 53 which is attached on the front fork 11 and covers the front wheel 2 from above; a rear fender 54 which covers the rear wheel 3 from above; and a front cover 55 which covers upper portions of the fork tubes 26, 26 from the front side.

The motorcycle 1 includes an evaporated fuel processing device 60. The evaporated fuel processing device 60 temporarily stores evaporated fuel generated in the fuel tank 42 and, thereafter, supplies the stored evaporated fuel to the intake system of the engine 10 so that the evaporated fuel is combusted in the engine 10. Due to the provision of the evaporated fuel processing device 60, the dispersion of evaporated fuel generated in the fuel tank 42 to the outside can be prevented.

Figure 2:
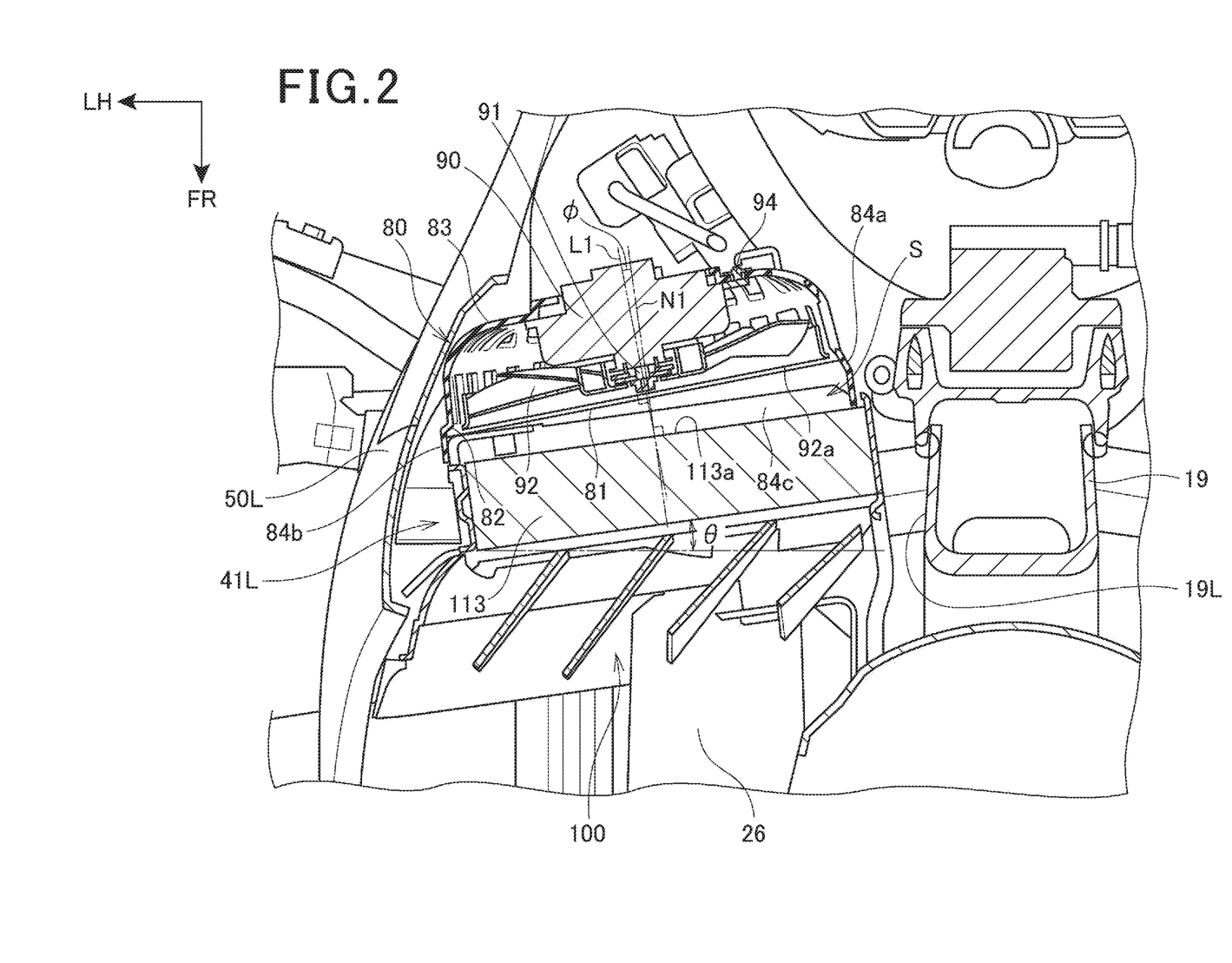
FIG. 2 is a view showing a cross section of a radiator disposed on a left side out of a pair of radiators.

FIG. 2 is a view showing a cross section of the radiator 41L disposed on the left side out of the pair of radiators 41L, 41R.

The radiator 41L is disposed on the left side of the down frame 19. Although not shown in FIG. 2, the right radiator 41R is disposed on the right side of the down frame 19.

The radiator 41L is disposed between the radiator shroud 50L on the left side which forms the vehicle body cover and an other-side side surface 19L of the down frame 19. The pair of radiators 41L, 41R is disposed in a slightly frontwardly inclined manner with respect to the vertical direction in a state where a heat radiation surface of a core 113 is directed in a longitudinal direction of the motorcycle 1.

Further, the radiators 41L, 41R are disposed in a slightly inclined manner at an angle θ such that the heat radiation surface of the core 113 is frontwardly inclined as the heat radiation surface extends outward in the vehicle width direction. A louver 100 is provided on front surfaces of the pair of radiators 41L, 41R (only the left radiator 41L is shown). The louver 100 straightens traveling air flowing through the core 113 and, at the same time, protects the core 113 by covering the core 113 from the front side.

Figure 3:
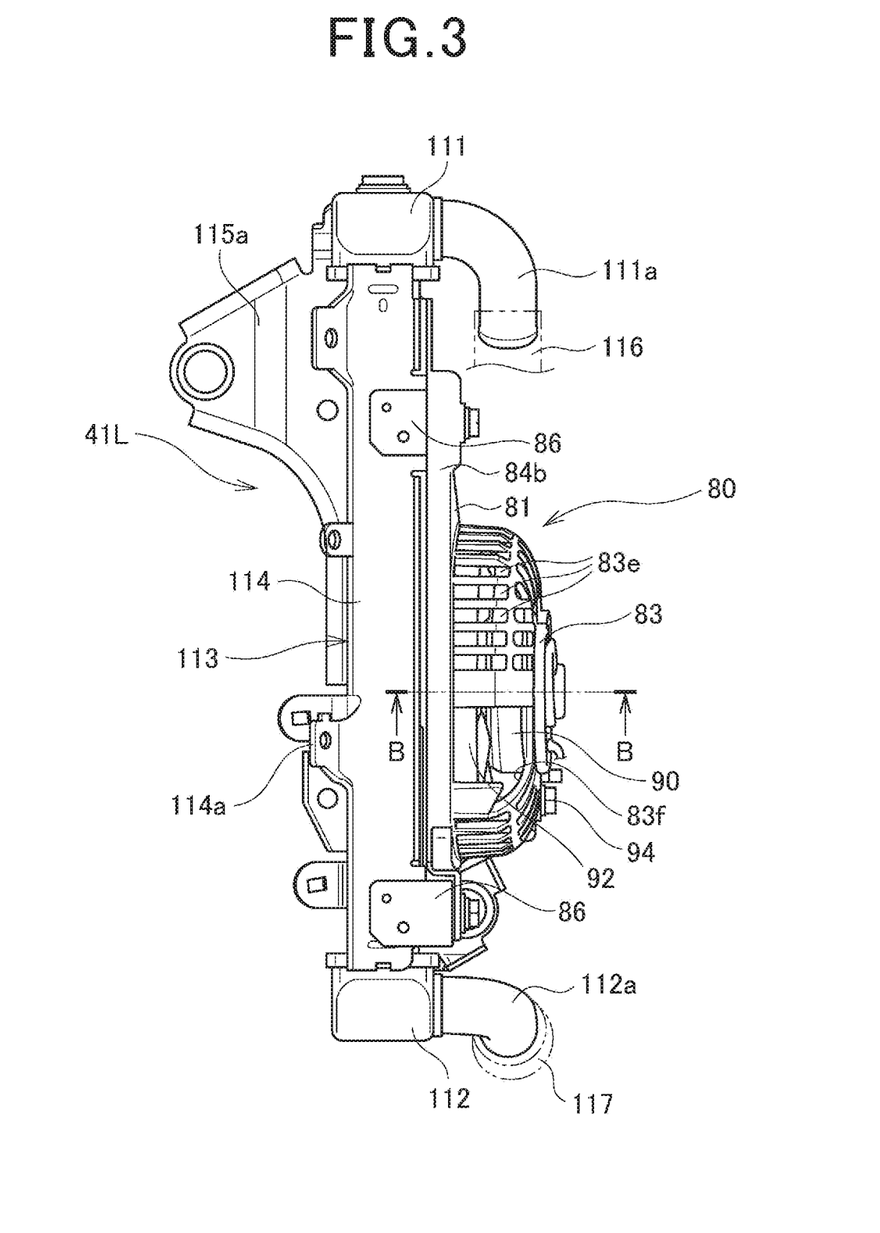
FIG. 3 is a view of the left radiator as viewed from a left side.
Figure 4:
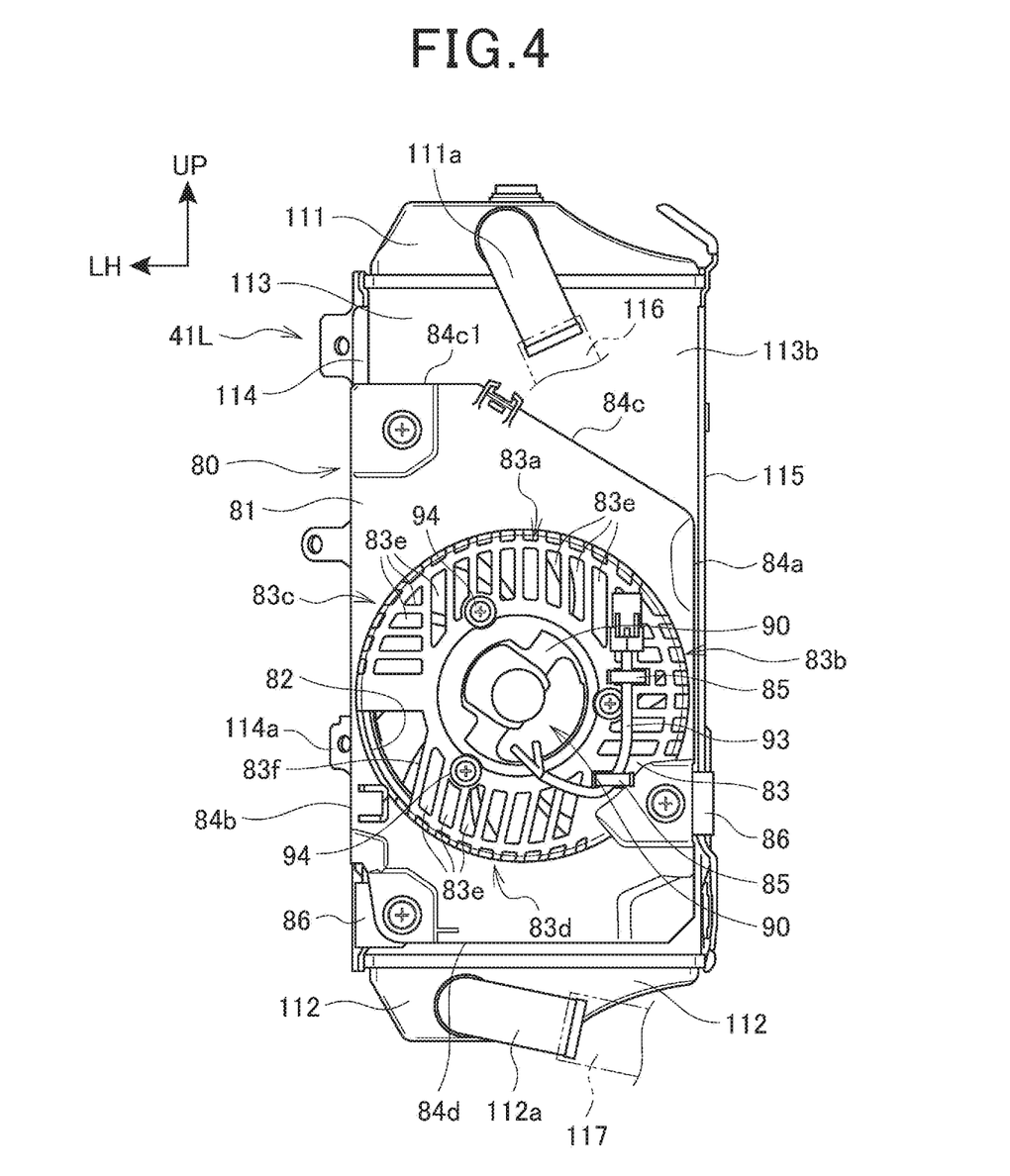
FIG. 4 is a view of the left radiator as viewed from a rear side.

FIG. 3 is a view of the left radiator 41L as viewed from the left side, and FIG. 4 is a view of the same left radiator 41L as viewed from the rear side. The right radiator 41R has the same basic structure as the left radiator 41L and hence, the description of the right radiator 41R is omitted.

The left radiator 41L includes: an upper tank 111; a lower tank 112; and the core 113 which connects the upper tank 111 and the lower tank 112 to each other in the vertical direction.

The core 113 is formed in a plate shape and includes: a plurality of cooling water tubes (not shown in the drawing) which make the upper tank 111 and the lower tank 112 communicate with each other; and a plurality of cooling fins (not shown in the drawing) which are provided on peripheries of the cooling tubes (not shown in the drawing). The above-mentioned cooling fins (not shown in the drawing) are surrounded by an outer plate portion 114 and an inner plate portion 115 from both sides.

A stay portion 115a which extends frontward is formed on an upper portion of the inner plate portion 115, and the core 113 is attached on the upper portion of the down frame 19 through the stay portion 115a.

A cover fixing portion 114a extending frontward is formed on the outer plate portion 114, and the core 113 is fastened to a lower end portion of a front portion of the radiator shroud 50L by bolts (not shown in the drawing) through the cover fixing portion 114a.

As shown in FIG. 3, a tubular upper hose connecting portion 111a is formed on the upper tank 111, and a tubular lower hose connecting portion 112a is formed on the lower tank 112. A radiator hose 116 is connected to the upper hose connecting portion 111a, and a radiator hose 117 is connected to the lower hose connecting portion 112a. These radiator hoses 116, 117 are connected to the engine 10 respectively.

Cooling water is fed under pressure by a water pump (not shown in the drawing) provided on the crankcase 32 and circulates between the engine 10 and the radiators 41L, 41R. Cooling water whose temperature is elevated after cooling the engine 10 is branched at the radiator hose 116 and flows into the upper tanks 111 of the left and right radiators 41L, 41R. Cooling water cooled by the respective radiators 41L, 41R flows out from the lower tanks 112, merges at the radiator hose 117, and is fed to the engine 10.

In this embodiment, a fan shroud 80 is disposed on a lower portion of the core 113 of the radiator 41L disposed on the left side. The fan shroud 80 includes: a plate portion (rear wall) 81 which covers a lower portion of the core 113; and a guard portion (guard member) 83 which is integrally formed on a center portion of the plate portion 81.

The plate portion 81 is fixed to the radiator 41L through an L-shaped stay member 86. One end portion of the stay member 86 is fastened to the plate portion 81 by a screw, and the other end portion of the stay member 86 is fixed to the outer plate portion 114 and the inner plate portion 115 which form side surfaces of the radiator 41.

The plate portion 81 is schematically formed in a vertically elongated trapezoidal shape. The plate portion 81 covers a lower portion of a rear surface 113a of the core 113.

A region 113b (rearwardly opening portion) where the rear surface 113a is not covered by the plate portion 81 is provided to an upper portion of the core 113 which is disposed above the plate portion 81. In the region 113b, a traveling air can pass through the core 113 without being interrupted by the plate portion 81 so that cooling performance by traveling air during traveling of the vehicle is minimally interrupted.

A guard portion 83 formed in a dome shape is formed on a center portion of the plate portion 81, and a radiator fan 90 is supported by the guard portion 83. A front end of the guard portion 83 is formed in a circular shape, and an opening 82 formed by being surrounded by a connecting portion between the plate portion 81 and the front end of the guard portion 83 is formed in the plate portion 81. The radiator fan 90 is disposed inside the opening 82.

Figure 5:
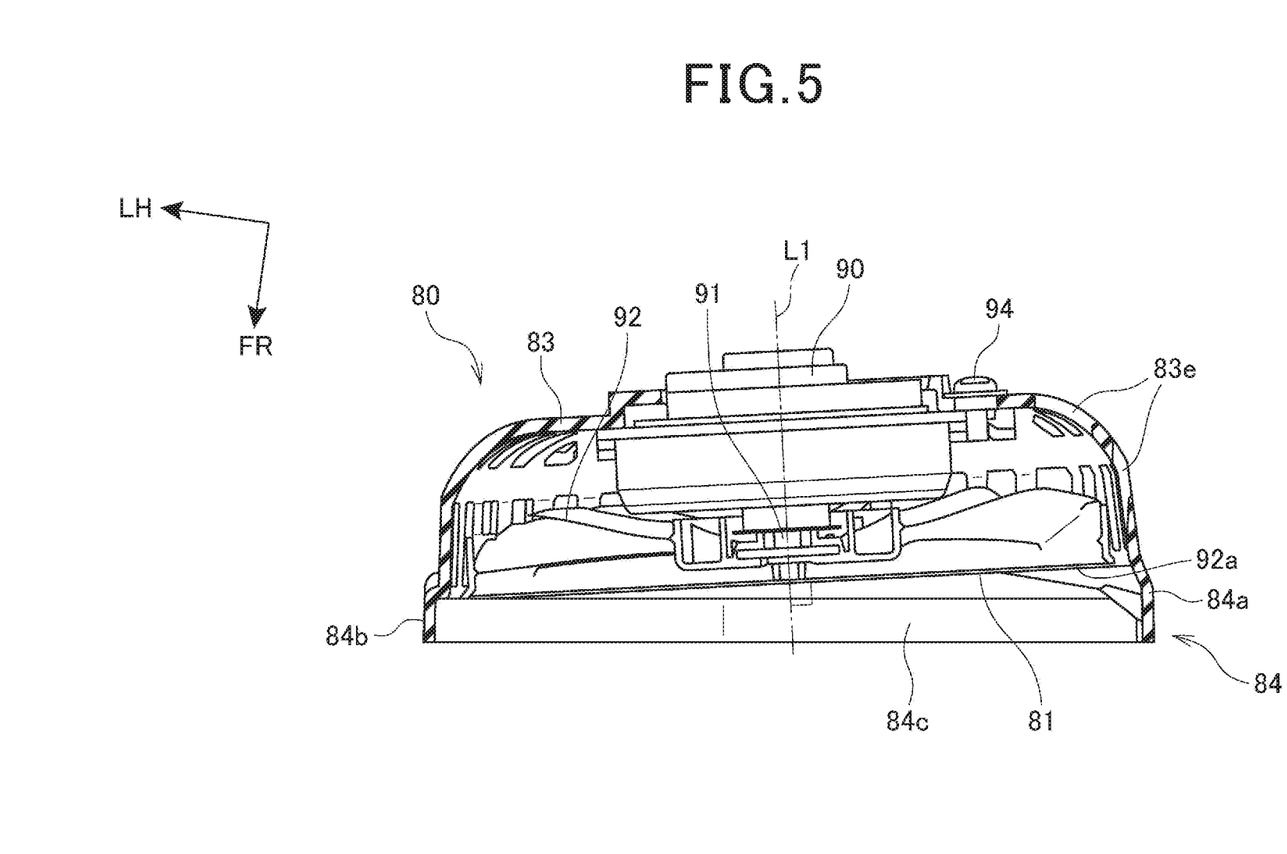
FIG. 5 is a cross-sectional view taken along a line B-B in FIG. 3.

The radiator fan 90 is fixed to the guard portion 83 by screws 94. A rotary shaft 91 of the radiator fan 90 is disposed perpendicular to a surface of the plate portion 81, and an axis L1 of the rotary shaft 91 extends perpendicular to the plate portion 81 (FIG. 3, FIG. 5). When blades 92 supported by the rotary shaft 91 are rotated, a front surface 92a becomes a boundary formed by front edges of the blades 92 and is formed parallel to the plate portion 81.

The guard portion 83 is formed in a grid shape, and a plurality of elongated-hole-shaped gaps 83e are formed in the guard portion 83. Accordingly, cooled air passes through the guard portion 83 in the longitudinal direction through the gaps 83e. Even when mud, pebbles and the like scatter from behind toward the radiator fan 90, such mud, pebbles and the like are brought into contact with the guard portion 83 and hence, the radiator fan 90 can be easily protected. With the provision of the guard portion 83, it is possible to prevent the radiator fan 90 from being damaged by mud and pebbles.

The plurality of gaps 83e are formed by a grid portion 83a which extends in the vertical direction at an upper portion of the guard portion 83, a grid portion 83b which extends in the lateral direction at a right portion of the guard portion 83, a grid portion 83c which extends in the lateral direction at a left portion of the guard portion 83, and a grid portion 83d which is inclined leftward and downward at a lower portion of the guard portion 83. A trapezoidal hole portion 83f is formed between the grid portion 83c and the grid portion 83d, and a portion of the radiator shroud 50L enters the hole portion 83f and hence, the radiator shroud 50L can be disposed close to the fan shroud 80.

A cantilever-shaped lock piece 85 is formed on a rear portion of the guard portion 83. A cable 93 extending from the radiator fan 90 is locked with the lock piece 85. The cable 93 is electrically connected to an ECU not shown in the drawing. The radiator fan 90 is driven and controlled during the motorcycle 1 is temporarily stopped or the like so that the left radiator 41L to which the radiator fan 90 is annexed is forcibly cooled.

FIG. 5 is a cross-sectional view taken along a line B-B in FIG. 3.

A peripheral wall 84 is formed on an outer peripheral edge of the plate portion 81. When the plate portion 81 is attached on the core 113, the peripheral wall 84 surrounds a space (gap) S formed between a rear surface 113a of the core 113 and the plate portion 81. The peripheral wall 84 has: an inner side wall 84a positioned inside of the vehicle in the vehicle width direction; an outer side wall 84b positioned outside of the vehicle in the vehicle width direction; an upper side wall 84c; and a lower side wall 84d (FIG. 4). The peripheral wall 84 is formed such that a height of the outer side wall 84b is lower than a height of the inner side wall 84a.

Accordingly, when the plate portion 81 is attached on the core 113, the plate portion 81 is attached on the core 113 in an inclined manner by an amount equal to a difference between the height of the outer side wall 84b and the height of the inner side wall 84a.

As shown in FIG. 2, the plate portion 81 is disposed in an inclined manner with respect to the core 113 such that the space (gap) S formed between the rear surface 113a of the core 113 of the radiator 41L and the plate portion 81 is formed to have a larger size in the inside in the vehicle width direction than in the outer side in the vehicle width direction. The space S is formed by being surrounded by the rear surface 113a of the core 113, the plate portion 81, and the peripheral wall 84. When the radiator fan 90 is driven and the blades 92 are rotated, a negative pressure is generated in the space S. When the negative pressure is generated in the space S, cooled air flows into the core 113 disposed in front of the space S so that the core 113 of the radiator 41L is forcibly cooled and, at the same time, cooled air which passes through the core 113 flows into the space S. Since the plate portion 81 is inclined with respect to the rear surface 113a of the core 113, compared to a case where the whole plate portion 81 is disposed close to the rear surface 113a of the core 113, a volume of the space S can be increased thus enhancing cooling performance of the radiator 41.

An axis L1 of the radiator fan 90 is disposed in an inclined manner with respect to a direction N1 (a normal line N1 of the rear surface 113a) in which the rear surface 113a of the core 113 is directed at an angle φ such that the axis L1 is disposed more outside in the vehicle width direction as the axis L1 extends rearward. The axis L1 is inclined with respect to the rear surface 113a and hence, a volume of the space S defined between a front surface 92a of the radiator fan 90 and the core 113 of the radiator 41 can be increased. By increasing a volume of the space S, a volume of the space S where a negative pressure is generated by the radiator fan 90 can be increased without excessively separating the radiator fan 90 and the core 113 from each other. Accordingly, cooled air which passes through the radiator 41 can be easily guided to the radiator fan 90 and hence, a large amount of cooled air can easily pass through the air guide structure of the radiator 41 rearward whereby cooling performance of the radiator 41 can be enhanced.

Further, the axis L1 of the radiator fan 90 is inclined outward in the vehicle width direction as the axis L1 extends rearward and hence, when the blades 92 are rotated, cooled air which passes through the radiator 41 is easily discharged to the outside in the vehicle width direction.

Figure 6:
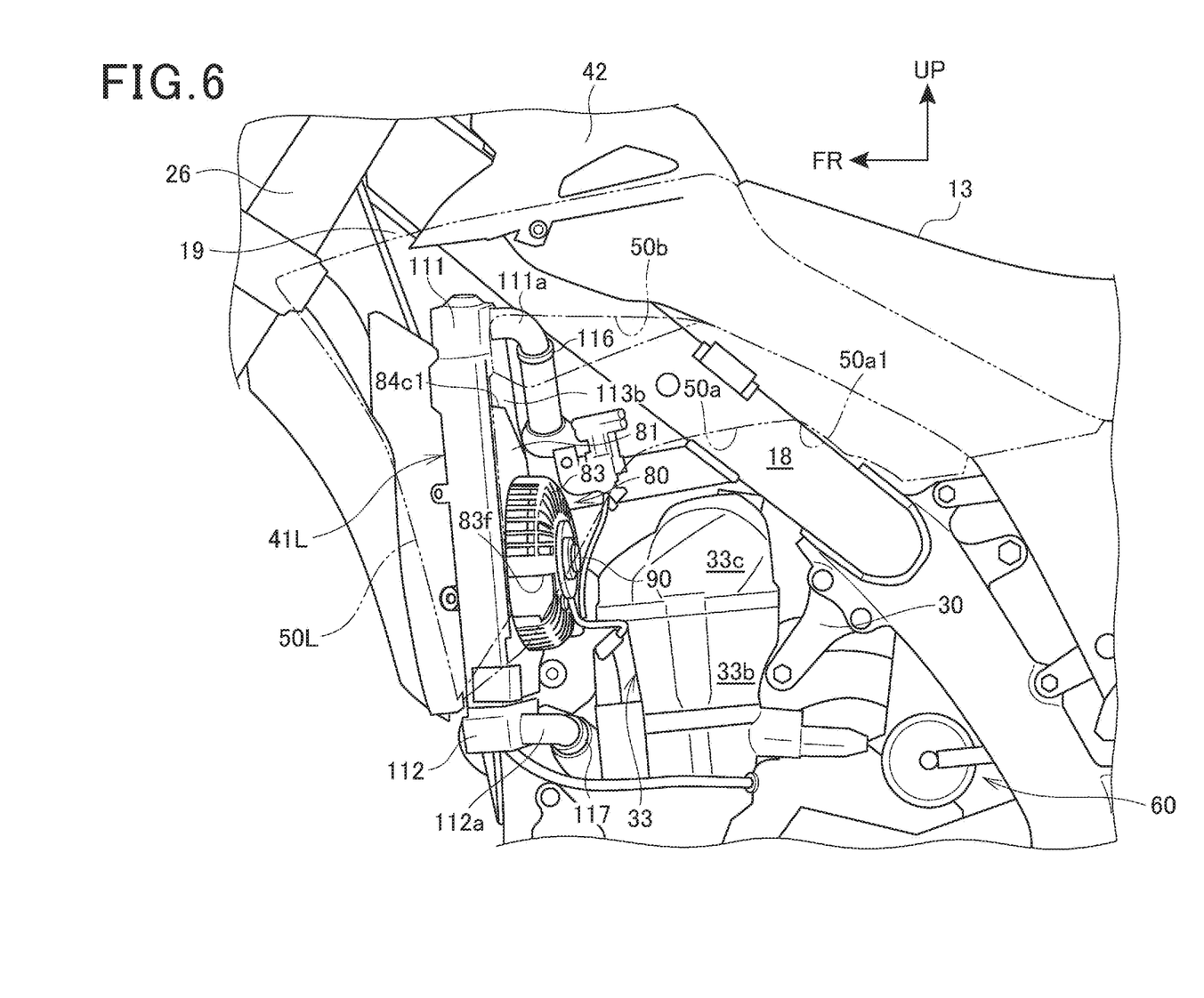
FIG. 6 is a view of the radiator disposed on a left side as viewed from a left side of the motorcycle.

FIG. 6 is a view of the radiator 41L disposed on a left side as viewed from a left side of the motorcycle 1.

The radiator 41L is disposed on a left side of the down frame 19, and is covered by the radiator shroud 50L on the left side which forms the vehicle body cover.

The radiator fan 90 is disposed at substantially the same height as the cylinder head cover 33c of the engine 10. Due to the supply of air from the radiator fan 90, air is supplied to the periphery of the cylinder head cover 33c.

A cutaway portion 50a is formed on the radiator shroud 50L by cutting the radiator shroud 50L in an upwardly curved manner as viewed in a side view of the vehicle, and a height position of the radiator fan 90 is positioned in the cutaway portion 50a. In this embodiment, a height position 50a1 of the cutaway portion 50a where the radiator shroud 50L is cut most is positioned above the radiator fan 90 and is positioned below an upper portion 84c1 of the plate portion 81. In the radiator shroud 50L, traveling air and discharged air from the radiator 41 are minimally interrupted by the cutaway portion 50a.

A hole 50b is formed in the radiator shroud 50L corresponding to an upper portion of the radiator 41. Due to the formation of the hole 50b, traveling air which passes through the region 113b of the core 113 can be discharged to the outside of the vehicle.

As has been described heretofore, according to this embodiment to which the present invention is applied, the motorcycle 1 includes: the body frame F having the head pipe 17 and the main tube 22 extending rearward from the head pipe 17; the engine 10 disposed below the main tube 22; the down frame 19 extending downward from the body frame F and disposed in front of the engine 10; and the radiators 41L, 41R disposed in front of the engine 10 and on the sides of the down frame 19. In this motorcycle 1, the opening 82 which opens rearward is formed in the fan shroud 80 which covers a rear surface of the left radiator 41L, the radiator fan 90 is disposed in the opening 82, and the front surface 92a of the radiator fan 90 is disposed such that the axis L1 of the radiator fan 90 is inclined outward with respect to the direction N1 in which the surface 113a of the core 113 is directed such that the space S formed with respect to the core 113 of the radiator 41L is increased from the outside toward the inside. Accordingly, since a volume of the space S defined between the front surface 92a of the radiator fan 90 and the core 113 of the radiator 41L can be increased, cooled air which passes through the radiator 41L can be easily guided to the radiator fan 90 and hence, a large amount of cooled air can easily pass through the radiator rearward whereby cooling performance of the radiator 41L can be enhanced.

In this embodiment, the fan shroud 80 has: the plate portion 81 which covers the rear surface 113a of the core 113; and the peripheral wall 84 which connects the edge portion of the plate portion 81 to the core 113, and the plate portion 81 is disposed in an inclined manner with respect to the core 113 such that the plate portion 81 is disposed substantially parallel to the front surface 92a of the radiator fan 90 and the space S with respect to the core 113 of the radiator 41L is increased from the outside toward the inside.

Accordingly, the space S defined between the front surface 92a of the radiator fan 90 and the core 113 of the radiator 41L can be increased thus enhancing cooling performance of the radiator 41L.

In this embodiment, the fuel tank 42 is disposed above the engine 10, the radiator shroud 50L which extends from the side of the fuel tank 42 to the side of the radiator 41L is disposed so as to cover the side of the radiator 41L, and the cutaway portion 50a which makes a space behind the radiator fan 90 open to the outside is formed at the same height as the radiator fan 90 of the radiator shroud 50L. Accordingly, due to the formation of the cutaway portion 50a, traveling air and air discharged from the radiator 41L can easily pass through the air guide structure of the radiator 41L outward.

In this embodiment, the fan shroud 80 may be disposed below the core 113, a region 113b where the rear surface 113a is not covered by the fan shroud 80 may be disposed above the core 113. Accordingly, with the provision of the region 113b, traveling air can easily pass through the radiator 41L during traveling of the vehicle and hence, cooling performance can be enhanced.

In this embodiment, the grid-like guard portion 83 which covers the rear side of the radiator fan 90 is provided on the fan shroud 80 corresponding to the position of the opening 82 including the radiator fan 90. Accordingly, with the provision of the guard portion 83, mud and pebbles minimally hit the radiator fan 90.

The above-described embodiment merely shows one embodiment of the present invention, and the embodiment can be arbitrarily modified and applied without departing from the gist of the present invention.

In the above-mentioned embodiment, although the description has been made with respect to the configuration where the radiator fan 90 and the fan shroud 80 are disposed on the left radiator 41L, the radiator fan 90 and the fan shroud 80 may be disposed on the right radiator 41R.

Further, although the description has been made with respect to the configuration where cooled water flows through the left and right radiators 41L, 41R in a branched manner in the radiator hose 116. The configuration may be adopted where cooled water flows through the core 113 of the other radiator after flowing through the core 113 of one radiator. Further, the radiator fan 90 and the fan shroud 80 may be disposed on one or both of the radiators 41L, 41R depending on temperature tendency of cooled water.

REFERENCE SIGNS LIST

10: engine
17: head pipe
19: down frame (down tube)
22: main tube
41L: radiator
42: fuel tank
50L: radiator shroud
50a: cutaway portion
80: fan shroud
81: plate portion (rear wall)
82: opening
83: guard portion (guard member)
84: peripheral wall
90: radiator fan
92a: front surface
113: core
113a: surface, rear surface
113b: region (rear open portion)

F: body frame
S: space (gap)
L1: axis
N1: direction

The invention claimed is:

1. A saddle riding vehicle comprising: a body frame having a head pipe and a main tube extending rearward from the head pipe; an engine disposed below the main tube; a down tube extending downward from the body frame and disposed in front of the engine; and a radiator disposed in front of the engine and on a side of the down tube, wherein the radiator includes a core whose outer shape including a rear surface is a rectangle, and wherein the rear surface of the core is flat, an opening which opens rearward is formed in a fan shroud which covers a rear surface of the radiator, a radiator fan is disposed in the opening, and a front surface of the radiator fan is disposed such that an axis of the radiator fan is inclined toward an outside in a vehicle width direction with respect to a direction in which the rear surface of the core of the radiator is directed so as to increase a gap between the front surface of the radiator fan and the flat rear surface of the core from an outer side toward an inner side, the fan shroud includes: a plate portion covering the rear surface of the core; and a peripheral wall for connecting an entire edge portion of the plate portion to the core, the peripheral wall comprises: an inner side wall positioned inside of the vehicle in the vehicle width direction; an outer side wall positioned outside of the vehicle in the vehicle width direction; an upper side wall; and a lower side wall, the peripheral wall is formed such that a height of the outer side wall is lower than a height of the inner side wall, and the plate portion is entirely disposed in an inclined manner with respect to the core by an amount equal to a difference between the height of the outer side wall and the height of the inner side wall such that the gap between the front surface of the radiator fan and the core of the radiator is increased from the outside toward the inside in the vehicle width direction and such that the plate portion is disposed parallel to the front surface of the radiator fan.

2. The saddle riding vehicle according to claim 1, wherein a fuel tank is disposed above the engine, a radiator shroud extending from a side of the fuel tank to a side of the radiator is disposed so as to cover a side of the radiator, and a cutaway portion which makes a space behind the radiator fan open to the outside in the vehicle width direction is formed in the radiator shroud at a same height as the radiator fan.

3. The saddle riding vehicle according to claim 1, wherein the fan shroud is disposed at a lower portion of the core, and the rear surface of the core has a region which that is disposed above the lower portion of the core and that is not covered by the fan shroud.

4. The saddle riding vehicle according to claim 1, wherein the opening is in the in the fan shroud for the radiator fan has a guard member, which is in a grid-shape and which covers a rear side of the radiator fan.

5. The saddle riding vehicle according to claim 1, wherein the radiator is disposed in an inclined manner such that a heat radiation surface of the core is frontwardly inclined as the heat radiation surface extends outward in the vehicle width direction.

* * * * *